(12) United States Patent
Watanabe

(10) Patent No.: US 8,983,061 B2
(45) Date of Patent: Mar. 17, 2015

(54) METHOD AND APPARATUS FOR CRYPTOGRAPHICALLY PROCESSING DATA

(75) Inventor: Masashi Watanabe, Tokushima (JP)

(73) Assignee: IVI Holdings Ltd., Boulder, CO (US)

( * ) Notice: Subject to any disclaimer, the term of this patent is extended or adjusted under 35 U.S.C. 154(b) by 1156 days.

(21) Appl. No.: 10/589,221

(22) PCT Filed: Feb. 13, 2004

(86) PCT No.: PCT/US2004/004117
§ 371 (c)(1),
(2), (4) Date: Aug. 11, 2006

(87) PCT Pub. No.: WO2005/088893
PCT Pub. Date: Sep. 22, 2005

(65) Prior Publication Data
US 2007/0154018 A1    Jul. 5, 2007

(51) Int. Cl.
| H04L 9/28 | (2006.01) |
| H04L 9/00 | (2006.01) |
| H04K 1/06 | (2006.01) |
| H04L 29/06 | (2006.01) |
| H04L 9/32 | (2006.01) |

(52) U.S. Cl.
CPC .......... *H04L 63/166* (2013.01); *H04L 63/0428* (2013.01); *H04L 63/0478* (2013.01); *H04L 63/164* (2013.01)
USPC ............... 380/28; 380/262; 380/264; 380/37; 713/150; 713/162; 713/168; 713/181

(58) Field of Classification Search
USPC ......... 380/28, 255, 258, 262, 264, 37, 42–44; 713/150, 162, 168, 171, 181
See application file for complete search history.

(56) References Cited

U.S. PATENT DOCUMENTS

| 4,582,985 A |   | 4/1986  | Löfberg |
| 5,008,935 A |   | 4/1991  | Roberts ........................... 380/29 |
| 5,995,623 A | * | 11/1999 | Kawano et al. ................ 713/189 |
| 6,160,797 A |   | 12/2000 | Robert, III et al. ........... 370/316 |

(Continued)

OTHER PUBLICATIONS

IDsmart, LLC. Participates at 12th Annual Cards & Payments Asia Forum—Apr. 25-27, 2007, *Business Wire*, Apr. 19, 2007.
IDsmart™ SensorCard™ website http:www.id-smart.com.
Olivier, "Secure biometric credentials from IDsmart," Apr. 17, 2007, http://securityfanatics.com/info/Biometric-secure-credentials-IDsmart.

(Continued)

*Primary Examiner* — Aravind Moorthy
(74) *Attorney, Agent, or Firm* — Marsh Fischmann & Breyfogle LLP; Daniel J. Sherwinter

(57) ABSTRACT

A method and apparatus cryptographically process data including a plurality of data segments. The cryptographic process includes (a) receiving a plurality of data segments, (b) selecting, for each data segment, a set of encryption information based on data contained in a predetermined portion of the data segment to be encrypted, and (c) encrypting each data segment using the set of encryption information selected for the data segment. At least one of an encryption algorithm, an encryption key, and an encryption parameter may be changed for each data segment based on the data contained in the predetermined portion. The predetermined portion may include a first predetermined portion for selecting a first set of encryption information, and a second predetermined portion for selecting a second set of encryption information, the encryption information including an encryption algorithm, an encryption key, and optionally an encryption parameter.

51 Claims, 13 Drawing Sheets

(56) References Cited

U.S. PATENT DOCUMENTS

| | | | |
|---|---|---|---|
| 6,256,690 B1 | 7/2001 | Carper | |
| 6,269,164 B1 | 7/2001 | Pires | 380/42 |
| 6,338,435 B1 | 1/2002 | Carper | |
| 6,390,374 B1 | 5/2002 | Carper et al. | |
| 6,480,935 B1 | 11/2002 | Carper et al. | |
| 6,865,658 B2* | 3/2005 | Tomori et al. | 711/173 |
| 7,242,772 B1* | 7/2007 | Tehranchi | 380/223 |
| 7,278,025 B2 | 10/2007 | Saito et al. | |
| 2005/0074116 A1* | 4/2005 | Hall et al. | 380/37 |
| 2006/0140197 A1* | 6/2006 | Robinson et al. | 370/401 |

OTHER PUBLICATIONS

Makki, Kia, et al., "The Secure Model for Enterprise Connectivity", IEEE, 2000, pp. 176-182.

Wu, Min, et al., "Communication-Friendly Encryption of Multimedia", IEEE, 2002, pp. 292-295.

Chueng, Teo Pock, "Implementation of Pipelined Data Encryption Standard (DES) Using Altera CPLD", IEEE, 2000, pp. III-17 to III-21.

Steward, Shawn, "Practicing Safe Data", Cellular Business, Jan. 1997, pp. 64-66.

International Search Report, PCT/US04/04117, (Sep. 9, 2004).

* cited by examiner

34

IP Header

| 0 | 4 | 8 | 12 | 16 | 20 | 24 | 28 |
|---|---|---|---|---|---|---|---|
| Version | IHL | Service Type | | Total Length | | | |
| Identifier | | | | Flags | Fragment Offset | | |
| Time to Live | | Protocol | | Header Checksum | | | |
| Source Address | | | | | | | |
| Destination Address | | | | | | | |
| IP Option & Padding | | | | | | | |

36

TCP Header

| Source Port | | Destination Port | |
|---|---|---|---|
| Sequence Number | | | |
| Acknowledgment Number | | | |
| Data Offset | TCP Flags | Window | |
| | TCP Checksum | Urgent Pointer | |
| TCP Option & Padding | | | |

38

TCP Data

44

| Data |
|---|

FIG. 4

METHOD AND APPARATUS FOR CRYPTOGRAPHICALLY PROCESSING DATA

CROSS REFERENCE TO RELATED APPLICATIONS OR PRIORITY CLAIM

This application is a national phase of International Application No. PCT/US2004/004117 entitled "Method And Apparatus For Cryptographically Processing Data", which was filed on Feb. 13, 2004.

FIELD OF THE INVENTION

The present invention relates to cryptography and cryptographic systems. More particularly, the present invention relates to a method and apparatus for cryptographically processing data including a plurality of data segments.

BACKGROUND OF THE INVENTION

A number of encryption methods and cryptographic systems (cryptosystems) are currently used in various fields. For example, there are symmetric cryptosystems and asymmetric cryptosystems. The symmetric cryptography, which is also referred to as secret-key cryptography, uses a single key (secret key) to encrypt and decrypt information. Asymmetric cryptography, which is also referred to as public-key cryptography, uses a pair of keys: one (public key) to encrypt data, and the other (private key) to decrypt it. Currently available encryption algorithms include, for example, Data Encryption Standard (DES) which is a symmetric algorithm employing a block cipher with a single 56-bit key, triple DES which is a secure form of DES using a 168-bit key, International Data Encryption Algorithm (IDEA) which is a block-mode secret-key encryption algorithm using a 128-bit key, RC4 which is a widely-used symmetric key algorithm, the Advanced Encryption Standard (AES) which provides stronger encryption scheme with alternative three key lengths of 128 bits, 192 bits, or 256 bits, and the like.

Many companies employ a symmetric cryptosystem for their secure communications, using a predetermined encryption algorithm with the fixed secret-key such as the triple DES or AES. Due to the continuous evolution of computer-based technology, security methods that have seemed unbreakable are becoming inadequate, for example, the 56-bit key size of DES is no longer considered secure against brute force attacks. Using the same encryption algorithm and the same secret-key for communication over long time may increase the risk of brute force attacks on the cryptosystem. However, replacing encryption algorithm and/or the secret-key in a once-implemented cryptosystem is typically very costly, since it requires some form of secure key exchange, in person, by courier, and the like, among all of the entities using the cryptosystem, and any change in the algorithm or secret key must also be synchronized among the entities. A fixed algorithm/key cryptosystem also lacks compatibility with other cryptosystems utilizing a different encryption algorithm and/or a different secret key.

Accordingly, it would be desirable to provide a cryptosystem which realizes secure communications and transactions which is less vulnerable to brute force and other attacks and also has high flexibility and compatibility.

BRIEF DESCRIPTION OF THE INVENTION

A method and apparatus cryptographically process data including a plurality of data segments. The cryptographic process includes (a) receiving a plurality of data segments, (b) selecting, for each data segment, a set of encryption information based on data contained in a predetermined portion of the data segment to be encrypted, and (c) encrypting each data segment using the set of encryption information selected for the data segment. At least one of an encryption algorithm, an encryption key, and an encryption parameter may be changed for each data segment based on the data contained in the predetermined portion. The predetermined portion may include a first predetermined portion for selecting a first set of encryption information, and a second predetermined portion for selecting a second set of encryption information, the encryption information including an encryption algorithm, an encryption key, and optionally an encryption parameter.

In accordance with one aspect of the present invention, a method for encrypting data includes (a) receiving a plurality of data segments, (b1) selecting, for each packet, a first set of encryption information based on data contained in a first predetermined portion of the data segment, (b2) selecting, for each packet, a second set of encryption information based on data contained in a second predetermined portion of the data segment, (c1) encrypting the second predetermined portion of each data segment using the first set of encryption information selected for the data segment, (c2) encrypting the remaining portion of each data segment using the second encryption information selected for the data segment, and (d) generating an encrypted data segment for each of the original data segments, the encrypted data segment having a first predetermined portion, a second predetermined portion, and a remaining portion, the first predetermined portion containing the original data in the corresponding first predetermined portion of the original data segment, the second predetermined portion containing the encrypted data of the corresponding second predetermined portion of the original data segment, and the remaining portion containing the encrypted data of the corresponding remaining portion of the original data segment.

In accordance with one aspect of the present invention, the method for decrypting data includes (a) receiving an encrypted data including a plurality of encrypted data segments, each of the encrypted data segments having a first predetermined portion, a second predetermined portion, and a remaining portion, the first predetermined portion containing original data in a corresponding first predetermined portion of an original data segment, the second predetermined portion containing encrypted data of a corresponding second predetermined portion of the original data segment, and the remaining portion containing the encrypted data of the corresponding remaining portion of the original data segment, (b1) selecting, for each encrypted data segment, a first set of encryption information based on the original data contained in the first predetermine portion of the encrypted data segment, (c1) decrypting the encrypted data contained in the second predetermined portion of each encrypted data segment using the first set of encryption information selected for the encrypted data segment, (b2) selecting, for each encrypted data segment, a second set of encryption information based on the decrypted data of the second predetermined portion, (c2) decrypting the remaining portion of each encrypted data segment using the second set of encryption information selected for the encrypted data segment.

In accordance with one aspect of the invention, an apparatus for cryptographically processing data includes (a) means for receiving a plurality of data segments, (b) means for selecting, for each data segment, a set of encryption information based on data contained in a predetermined portion of the data segment to be encrypted, and (c) means for encrypting each data segment using the set of encryption information selected for the data segment. The means for selecting may change at least one of an encryption algorithm, an encryption key, and an encryption parameter for each data segment based on the data contained in the predetermined portion.

In accordance with one aspect of the invention, the means for selecting includes (e) means for generating, for each data segment, a value from data contained in the predetermined portion of the data segment, and (f) means for selecting a set of encryption information associated with the generated value, the set of encryption information including an encryption algorithm, an encryption key, and optionally an encryption parameter. The means for generating a value may include means for hashing the data contained in the predetermined portion using a hash key.

In accordance with one aspect of the invention, the apparatus may further includes means for providing an encryption table containing an encryption type identifier, an encryption key for the encryption type, and an encryption parameter, for each entry associated with a generate value.

In accordance with one aspect of the invention, the predetermined portion includes a first predetermined portion for selecting a first set of encryption information, and a second predetermined portion for selecting a second set of encryption information. Each set of encryption information includes an encryption algorithm, an encryption key, and optionally an encryption parameter.

In accordance with one aspect of the invention, the apparatus may further include means for encrypting the second predetermined portion using the first set of encryption information, and means for encrypting the remaining portion of the data segment using the second set of encryption information.

In accordance with one aspect of the invention, the apparatus may further include means for generating an encrypted data segment for each of the original data segments, the encrypted data segment having a first predetermined portion, a second predetermined portion, and a remaining portion, the first predetermined portion containing the original data in the corresponding first predetermined portion of the original data segment, the second predetermined portion containing the encrypted data of the corresponding second predetermined portion of the original data segment, and the remaining portion containing the encrypted data of the corresponding remaining portion of the original data segment.

In accordance with one aspect of the invention, the apparatus may further include means for transmitting a plurality of encrypted data segments as a stream of encrypted data. The apparatus may also include means for storing a plurality of encrypted data segments on a data storage device, each encrypted data segment corresponding to a respective data sector of the data storage device.

In accordance with one aspect of the invention, the apparatus may further include (a) means for receiving the encrypted data including a plurality of encrypted data segments, (b1) means for selecting, for each encrypted data segment, a first set of encryption information based on data contained in the first predetermine portion of the encrypted data segment, (c1) means for decrypting the encrypted data contained in the second predetermined portion of each encrypted data segment using the first set of encryption information selected for the encrypted data segment, (b2) selecting, for each encrypted data segment, a second set of encryption information based on the decrypted data of the second predetermined portion, and (c2) decrypting the remaining portion of each encrypted data segment using the second set of encryption information selected for the encrypted data segment.

In accordance with one aspect of the invention, the means for selecting the first encryption information may include means for generating a first value from the original data contained in the first predetermined portion of the encrypted data segment. The means for generating the first value may include means for hashing the data contained in the first predetermined portion using a first hash key.

In accordance with one aspect of the invention, means for selecting the second encryption information may include means for generating a second value from the decrypted data of the second predetermined portion of the encrypted data segment. The means for generating the second value may include means for hashing the decrypted data of the second predetermined portion using a second hash key.

In accordance with one aspect of the invention, the apparatus for decrypting data includes (a) means for receiving a plurality of encrypted data segments, each of the encrypted data segments having a predetermined portion, (b) means for selecting, for each encrypted data segment, a set of encryption information based on data contained in the predetermined portion of the encrypted data segment, and (c) means for decrypting each encrypted data segment using the encryption information selected for the encrypted data segment.

In accordance with one aspect of the invention, the means for selecting may include means for generating, for each encrypted data segment, a value from data contained in the predetermined portion of the encrypted data segment, and means for selecting a set of encryption information associated with the generated value, the set of encryption information including an encryption algorithm, an encryption key, and optionally an encryption parameter. The means for generating a value may include means for hashing the data contained in the predetermined portion using a hash key.

In accordance with one aspect of the invention, the apparatus may further include means for providing an encryption type identifier, an encryption key for the encryption type, and an encryption parameter associated with a generated value.

In accordance with one aspect of the invention, the predetermined portion may include a first predetermined portion for selecting a first set of encryption information, and a second predetermined portion for selecting a second set of encryption information. Each set of encryption information may include an encryption algorithm, an encryption key, and optionally an encryption parameter.

In accordance with one aspect of the invention, the first predetermined portion contains data for a first protocol layer, and the second predetermined portion contains data for a second protocol layer, wherein the first protocol layer is lower than the second protocol layer. The first predetermined portion may be an Internet Protocol (IP) header of the data packet. The second predetermined portion may be a selected portion of a data field, a Transmission Control Protocol (TCP) header, or a User Datagram Protocol (UDP) header of the data packet.

In accordance with one aspect of the invention, the first predetermined portion is a first selected portion in a sector in a data storage device, and the second predetermined portion is a second selected portion in the sector.

In accordance with one aspect of the invention, the data contained in the second predetermined portion of an encrypted data segment has been encrypted using the first set of encryption information, and the data contained in the remaining portion of the encrypted data segment has been encrypted using the second set of encryption information.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 4 is a diagram schematically illustrating an example of a data packet in which the first predetermined portion is an Internet Protocol (IP) header, and the second predetermined portion is a Transmission Control Protocol (TCP) header.

DETAILED DESCRIPTION

Embodiments of the present invention are described herein in the context of a method and apparatus for encrypting and decrypting data including a plurality of data segments. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 1A:
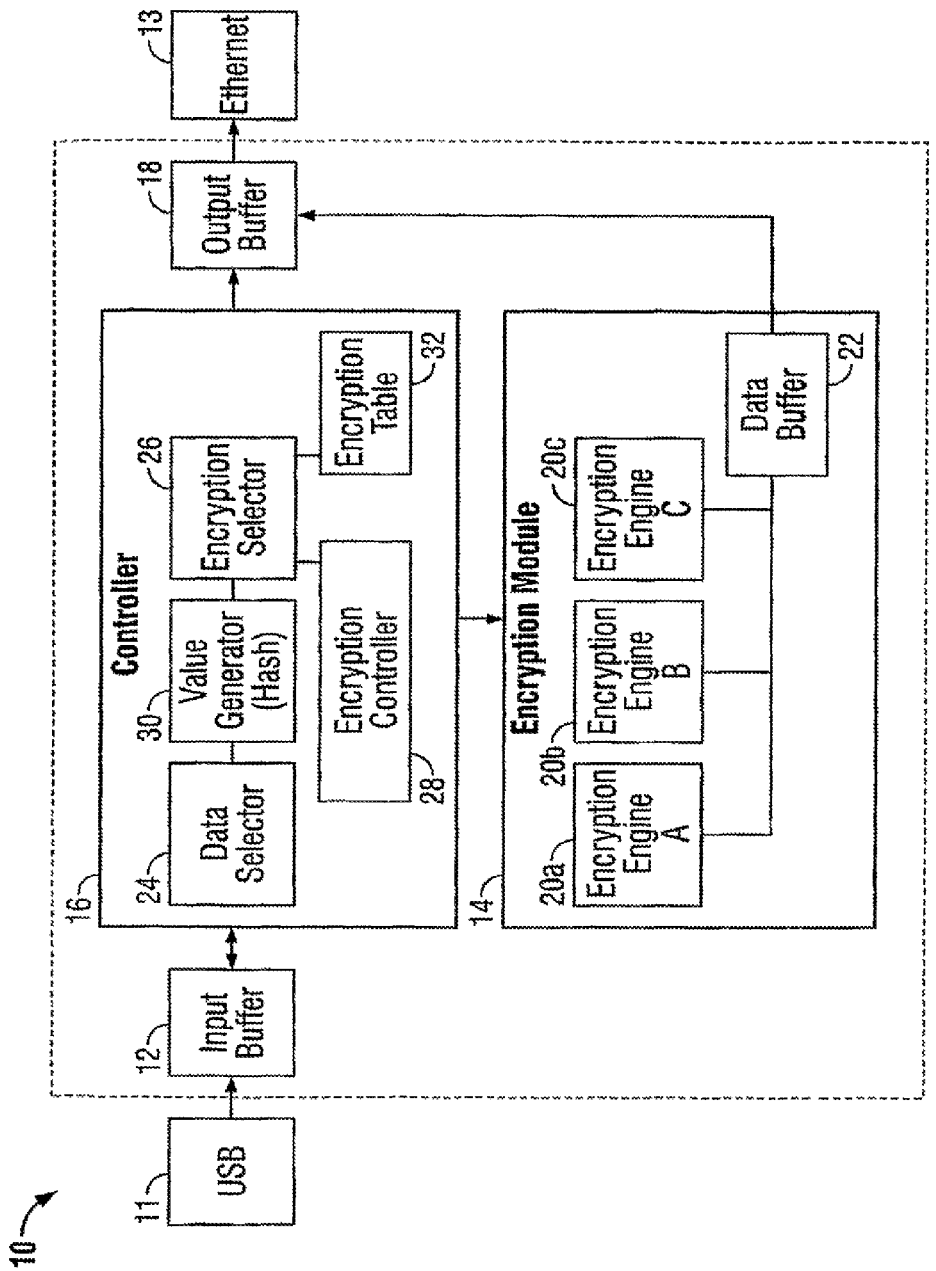
FIG. 1A is a block diagram schematically illustrating an encryption part of an apparatus for encrypting/decrypting data in accordance with one embodiment of the present invention.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described here FIG. 1A schematically illustrates an apparatus 10 for encrypting/decrypting data in accordance with one embodiment of the present invention. As shown in FIG. 1A, the apparatus 10 includes an input buffer 12, and the encryption module 14, a controller 16 coupled to the input buffer 12 and the encryption module 14, and an output buffer 18 coupled to the controller 16 and the encryption module 14. The input buffer 12 is adapted to receive data including a plurality of data segments. For example, such data may be a data stream including a plurality of data packets. The data segments may also be read from corresponding sectors of a recording medium or data storage device such as a hard disk, CD ROM, DVD, memory card, and the like. The encryption module 14 is adapted to encrypt each data segment. The output buffer 18 buffers the encrypted data segments from the encryption module 14, and outputs encrypted data including a plurality of encrypted data segments.

For example, as shown in FIG. 1A, the apparatus 10 may be used between a universal serial bus (USB) port 11 and an Ethernet port 13, in such a case where a host computer communicates via a LAN. The apparatus 10 can also be used for secure communications via WAN, the Internet, wireless network, and the like. Furthermore, the apparatus 10 may be used with a small computer system interface (SCSI), an intelligent/integrated drive electronics (IDE) interface, an enhanced IDE interface, and the like, to store secure data in mass storage devices. The apparatus may also be used for the other type of digital data transfer.

The controller 16 is adapted to select a set of encryption information for each data segment based on data contained in a predetermined portion of the data segment to be encrypted. For example, the encryption information includes an encryption algorithm, an encryption key, and an encryption parameter such as an initial vector. The encryption parameter may be used to set or initialize the encryption process to a specific state. Since the encryption information is selected based on data in a specific portion of the data segment to be encrypted, typically, at least one of the encryption algorithm, the encryption key, and the encryption parameter is changed for each data segment. In other words, the encryption information is "self-determined" for each data segment using the data contained in the data segment itself. The predetermined portion of the data segment may be a header of each data packet, a selected portion of the data field of the data packet, for example, a specific length of data starting at a predetermined number of bytes from the beginning of the data field. The predetermined portion may be a selected portion of a sector in a data storage device, a sector number or address field of each sector in a data storage device, and the like.

The encryption module 14 includes a plurality of encryption engines 20 (20a, 20b, 20c, ...), each corresponding to an encryption algorithm to be selected by the controller 16. The encryption module 14 may further include a data buffer 22 coupled to each of the plurality of encryption engines 20.

In accordance with one embodiment of the present invention, as shown in FIG. 1A, the controller 16 includes a data selector 24, an encryption selector 26 coupled with the data selector 24, and an encryption controller 28. The data selector 24 is adapted to select the predetermined portion from each data segment. The encryption selector 26 is adapted to select a set of encryption information in accordance with data contained in the predetermined portion selected by the data selector 24. The set of encryption information includes, for example, an encryption algorithm, an encryption key, and optionally an encryption parameter. The encryption controller 28 is adapted to select and activate one of the encryption engines 20 based on the encryption information. For example, if an encryption algorithm A is selected by the encryption selector 26, the encryption controller 28 selects a corresponding encryption engine (A) 20a and activates or initializes the encryption engine 20a using the encryption parameters. The data is encrypted by the encryption engine 20a using the selected key. It should be noted that a different key and/or a different encryption parameter yield different encrypted data even if the same encryption algorithm and the thus same encryption engine are used.

In accordance with one embodiment of the present invention, the controller 16 further includes a value generator 30 coupled to the data selector 24. The value generator is adapted to generate a value from the data contained in the predetermined portion. For example, the value generator 30 may include a hash function and hash the data using a hash key to produce the value. The hash key may be preinstalled in the value generator 30, or may be selected when the controller 16 is first programmed.

Figures 2, 3:
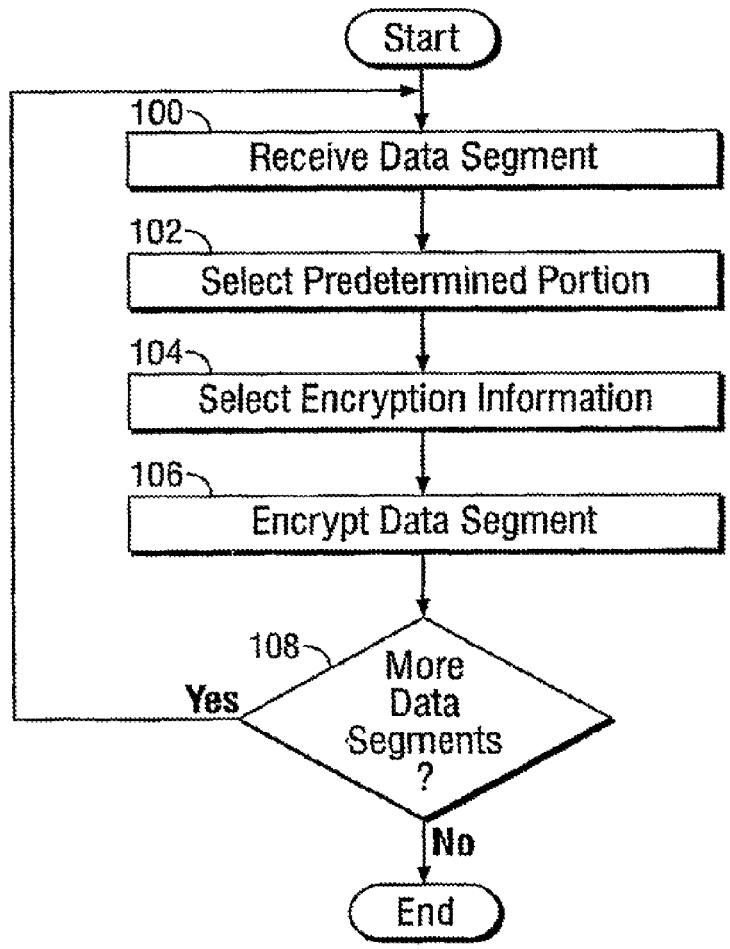
FIG. 2 is a diagram schematically illustrating an example of the encryption table in accordance with one embodiment of the present invention.
FIG. 3 is a process flow diagram schematically illustrating a method for encrypting/decrypting data in accordance with one embodiment of the present invention.

In accordance with one embodiment of the present invention, the encryption controller 26 includes an encryption table 32. The encryption table 32 contains an encryption type identifier, an encryption key for the encryption type, and an encryption parameter such as an initial vector specifying an initial encryption state of the encryption engine, for each entry associated with a value generated by the value generator 30. FIG. 2 schematically illustrates an example of the encryption table 32. As shown in FIG. 2, each entry of the encryption table 32 has an index corresponding to the generated value, for example, a hash value, and a corresponding set of an encryption algorithm (encryption type), a key for the encryption algorithm, and an initial vector (encryption parameter). The number of the entries depends on the value generated from the predetermined portion. In one embodiment of the present invention, an encryption table has about 1000 entries. Typically, a different index value is derived from the predetermined portion of a different data segment, and thus each data segment is encrypted using different encryption information.

Figure 1B:
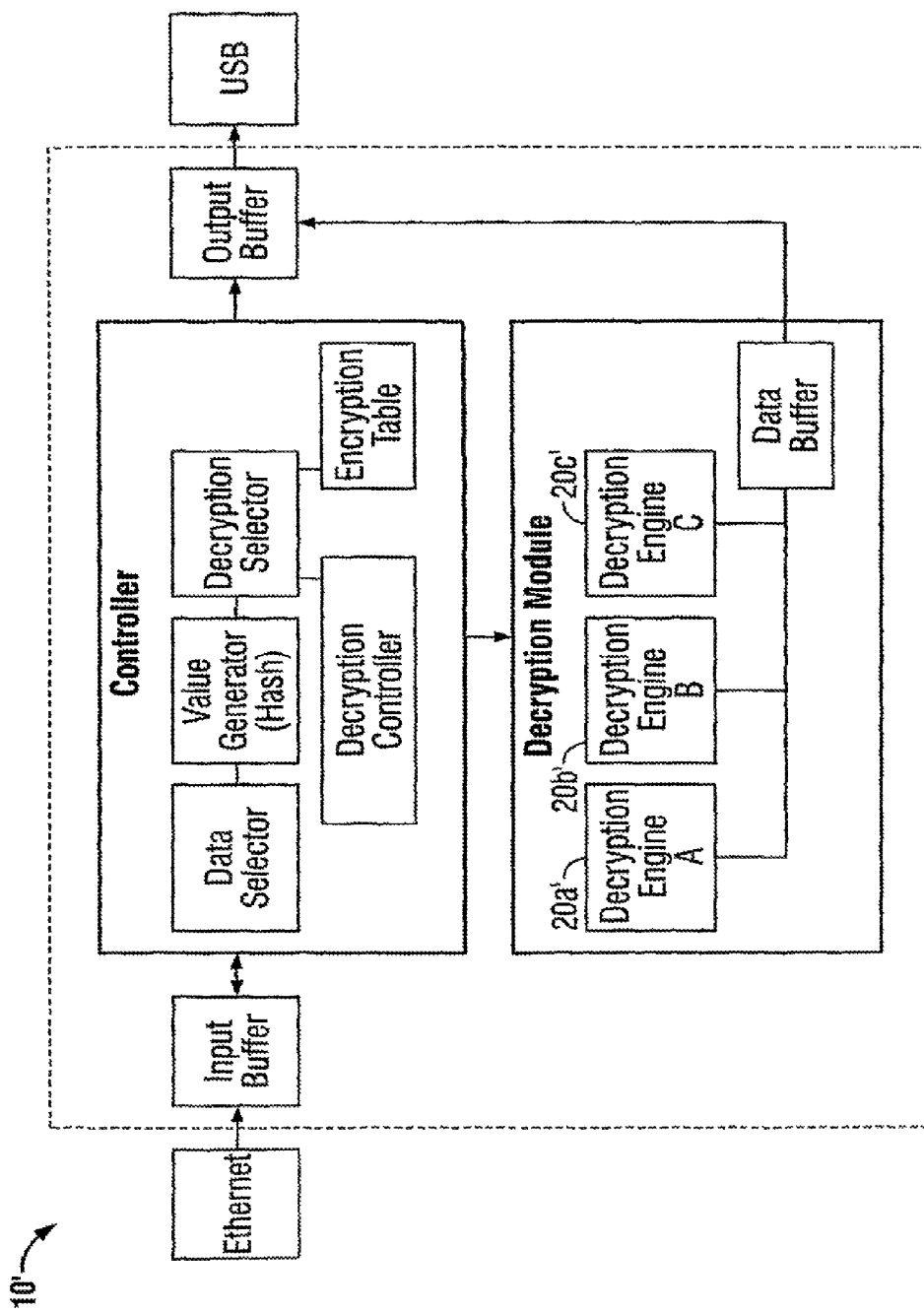
FIG. 1B is a block diagram schematically illustrating an decryption part of an apparatus for encrypting/decrypting data in accordance with one embodiment of the present invention.

The above description is with respect to the encryption part of the apparatus 10. FIG. 1B schematically illustrates a corresponding decryption part 10' of the apparatus 10 in accordance with one embodiment of the present invention. As shown in FIG. 1B, the decryption part 10' can be constructed symmetrically to the encryption part (FIG. 1A) of the apparatus 10, including decryption engines 20a', 20b', and 20c' in place of the encryption engines 20a, 20b, and 20c, as is well understood by one of ordinary skill in the art without further explanation.

FIG. 3 schematically illustrates a method for encrypting/decrypting data in accordance with one embodiment of the present invention. The method may be performed by the encryption/decryption apparatus 10. A plurality of data segments are received, for example, by receiving a data stream including a plurality of data packets, or reading from a data storage device including a plurality of data sectors or addresses. The received data segments may be buffered by an input buffer. The data segments are encrypted segment by segment. As shown in FIG. 3, each data segment is received (100), and a predetermined portion of each data segment is selected (102), and a set of encryption information is selected based on data contained in the predetermined portion of the data segment to be encrypted (104). The data segment is encrypted using the selected set of encryption information (106). The next data segment is processed in the same manner until all data segments in the input buffer are processed (108). The set of encryption information may include an encryption algorithm, an encryption key, and optionally an encryption parameter, as described above, ant typically at least one of the encryption algorithm, the encryption key, and the encryption parameter is changed for each data segment based the data contained in the predetermined portion.

As discussed above, in selecting the encryption information, a value (such as a hash value) may be generated from the data contained in the predetermined portion of the data segment, and the set of encryption information may be selected using the generated value. The set of encryption information may be provided in a form of an encryption table such as the encryption table 32 (FIG. 2) described above.

In accordance with one embodiment of the present invention, the predetermined portion includes a first predetermined portion and a second predetermined portion. In the case where the data segment is a data packet, the first predetermined portion may contain data for a first protocol layer, and the second predetermined portion may contain data for a second protocol layer which is higher than the first protocol layer in the protocol hierarchy. The first protocol layer may be the network layer (or the Internet layer), and the second protocol layer may be the Transport layer.

Figure 5:
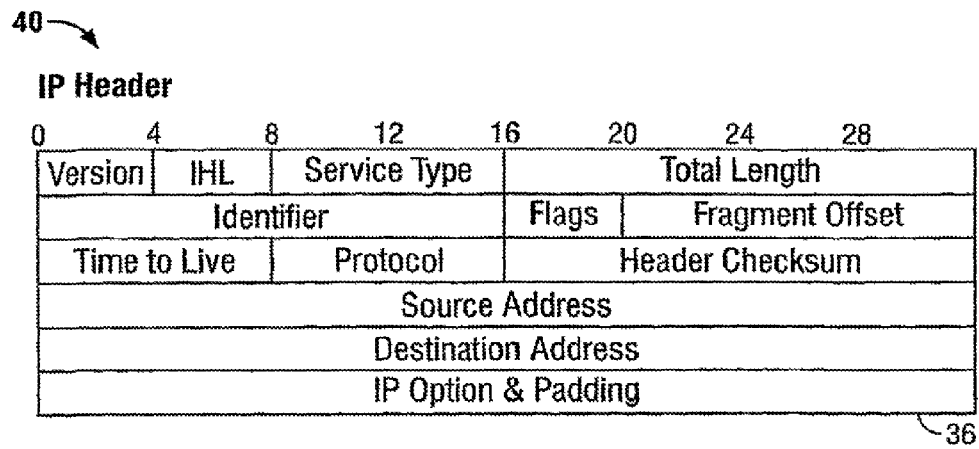
FIG. 5 is a diagram schematically illustrating an example of a data packet in which the first predetermined portion is an Internet Protocol (IP) header, and the second predetermined portion is a User Datagram Protocol (UDP) header.

FIG. 4 schematically illustrates an example of a data packet 34 in which the first predetermined portion is an Internet Protocol (IP) header 36, and the second predetermined portion is a Transmission Control Protocol (TCP) header 38 of the data packet 34. FIG. 5 schematically illustrates an example of a data packet 40 in which the first predetermined portion is an Internet Protocol (IP) header 36, and the second predetermined portion is a User Datagram Protocol (UDP) header 42 of the data packet 40. It should be noted that although the IP header 36, the TCP header 38, and the subsequent TCP data field 44 are illustrated separately in FIG. 4, they are contiguous in the data packet 34. Similarly, although the IP header 36, the UDP header 38, and the subsequent UDP data field 46 are illustrated separately in FIG. 5, they are contiguous in the data packet 40. In addition, the information illustrated in each header is by way of example, and not limiting in any way. All of the information in the header may be used to derive a (hash) value, or some part of the information may be selected to generate a value.

Figure 6:
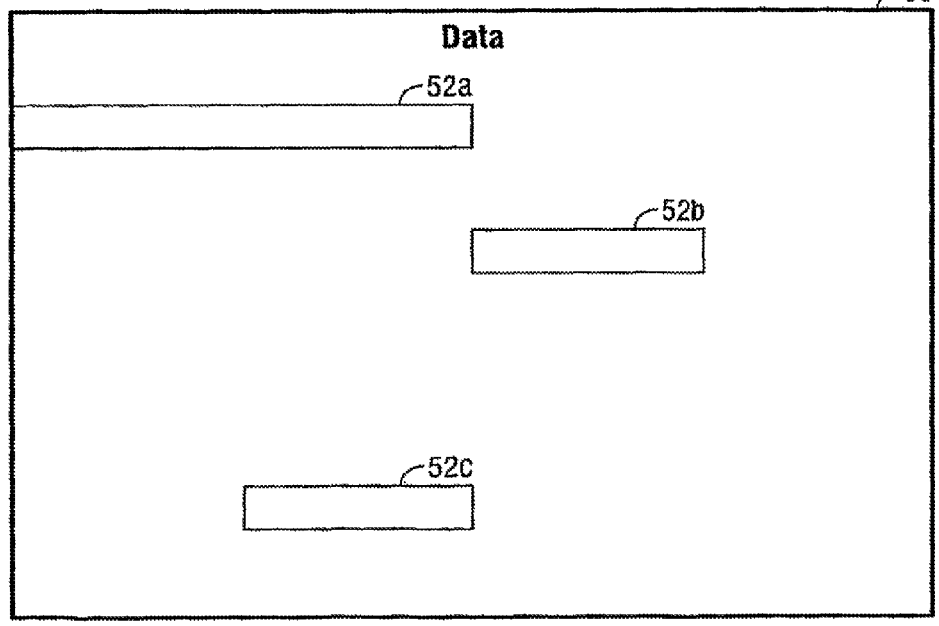
FIG. 6 is a diagram schematically illustrating an example of a data packet in which the first predetermined portion is an Internet Protocol (IP) header, and the second predetermined portion is a selected portion of a data field.

In accordance with one embodiment of the present invention, the second predetermined portion is not limited to a TCP or UDP header, but may be selected from a data field. FIG. 6 schematically illustrates an example of a data packet 48 in which the first predetermined portion is an Internet Protocol (IP) header 36, and the second predetermined portion is a selected portion 52 (52a, 52b, and 52c) of a data field 50 of the data packet 48. As shown in FIG. 6, the selected portion 52 may be divided and distributed in the data field 50, and specified by a predetermined number of bytes from the beginning of the data field 50 and a predetermined data length. One single portion may be selected.

Figure 7:
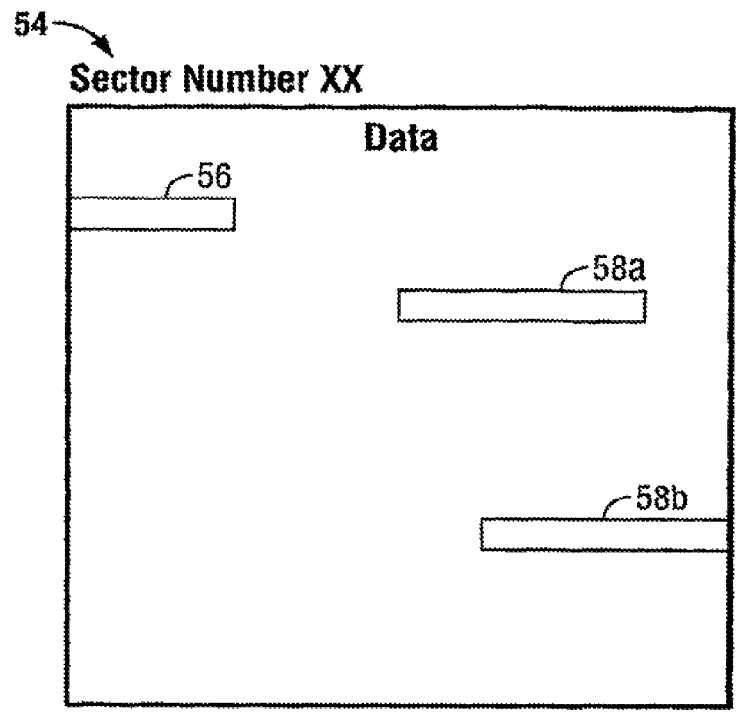
FIG. 7 is a diagram schematically illustrating an example of the first and second predetermined portions in a sector of a data storage device.
Figure 8:
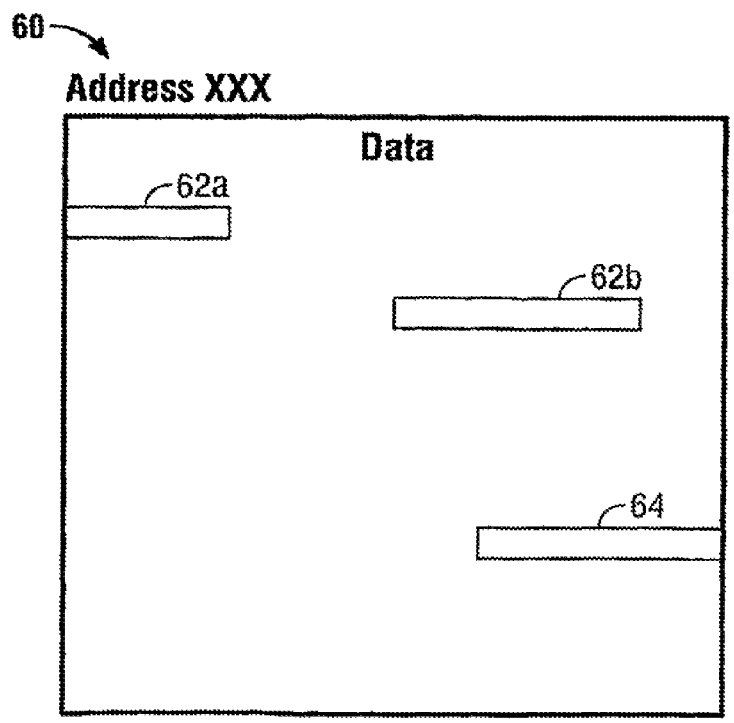
FIG. 8 is a diagram schematically illustrating an example of the first and second predetermined portions in a data segment stored in a memory card in which the data segment corresponds to data stored in each address.

In accordance with one embodiment of the present invention, the data segments may be sectors in a data storage device such as a hard disk, CD ROM, DVD, memory card, or other mass storage device. In this case, the first predetermined portion is a first selected portion in a sector in a data storage device, and the second predetermined portion is a second selected portion in the sector. FIG. 7 schematically illustrates such an example. In FIG. 7, the first predetermined portion is a first selected portion 56 in a sector 54 in a data storage device, and the second predetermined portion is a second selected portion 58 (58a, 58b) in the sector 54. FIG. 8 schematically illustrates an example of a memory card in which the data segment corresponds to data stored in each address. In such a case, the data may be encrypted address by address, and the first predetermined portion is a first selected portion 62 (62a, 63b) in a memory address 60, and the second predetermined portion is a second selected portion 64 in the address 60. As shown in FIGS. 7 and 8, the first and/or second predetermined portion may be divided and distributed in the sector or data in the memory address, or may be a single portion.

Figure 9:
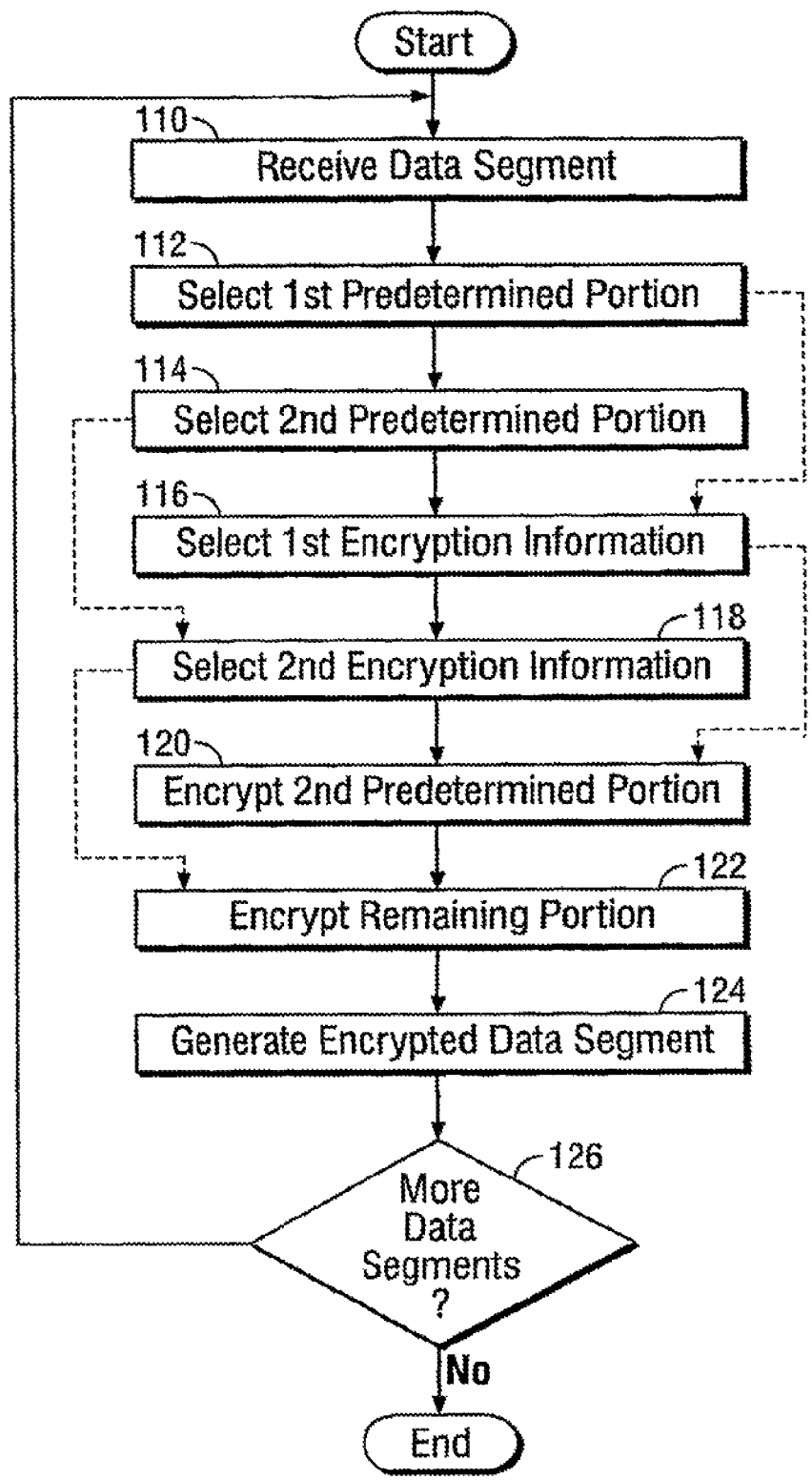
FIG. 9 is a process flow diagram schematically illustrating a method for encrypting data in accordance with one embodiment of the present invention, in which the predetermined portion includes a first predetermined portion and a second predetermined portion.
Figure 10:
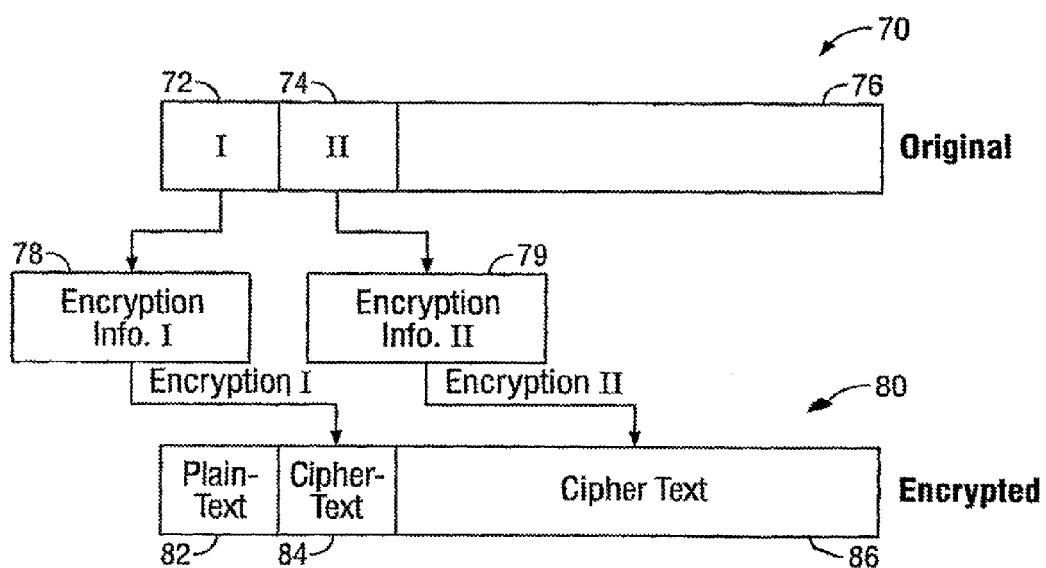
FIG. 10 is a diagram schematically illustrating an example of encrypting a data packet using the method shown in FIG. 9.

FIG. 9 schematically illustrates a method for encrypting data in accordance with one embodiment of the present invention, in which the predetermined portion includes a first predetermined portion and a second predetermined portion, as described above. FIG. 10 schematically illustrates an example of encrypting a data packet 70 using the method shown in FIG. 9, where the data packet 70 includes a first predetermined portion 72 (such as an IP header) and a second predetermined portion 74 (such as a TCP header or a selected portion of the data field).

As shown in FIG. 9, for each data segment received (110), the first predetermined portion and the second predetermined portion are selected (112, 114). Also referring to FIG. 10, the first encryption information 78 is selected based on the data contained in the first predetermined portion 72 (116). As discussed above, this selection 116 may include, for example, deriving a hash value from the first predetermined portion 72 and selecting the first encryption information using an encryption table associating the hash value with a respective set of encryption information. Similarly, the second encryption information 79 is selected based on the data contained in the second predetermined portion 74 (118). This selection 118 may also include, for example, deriving a hash value from the second predetermined portion 74 and selecting the second encryption information using an encryption table associating the hash value with a respective set of encryption information. A respective hash key and a respective encryption table may be provided for each of the selection process 116 and 118. For example, the controller 16 of the encryption/decryption apparatus 10 (FIG. 1) may include a first set of the hash key and the encryption table for the first predetermined portion, and a second set of the hash key and the encryption table for the second predetermined portion.

Then, the second predetermined portion 74 is encrypted using the first encryption information 78 (120), and the remaining portion of the data segment 76 is encrypted using the second encryption information 79 (122). The remaining portion 76 is all of the remaining data in the data segment other than the first and second predetermined portions. As shown in FIG. 10, the first predetermined portion 82 containing the original data (also referred to as "plaintext"), the second predetermined portion 84 containing encrypted data (also referred to as "ciphertext"), and the remaining portion 86 containing encrypted data are combined to generate an encrypted data segment (packet) 80 corresponding to the original data segment (packet) 70 (124). For example, referring to FIG. 1, the second predetermined portion may be encrypted using the encryption engine 20a, and the remaining portion may be encrypted using the encryption engine 20b, and the respective encrypted data are combined with the first predetermined portion into the encrypted data segment in the data buffer 22, and sent to the output buffer 18.

The processes 110 through 124 are performed until all of the data segments are encrypted (126). It should be noted that the selection and encryption processes are controlled such that the second encryption information 79 is selected before the data contained in the second predetermined portion 74 is encrypted, and the plaintext data for the first predetermined portion 84, the ciphertext for the second predetermined portion 84, and the ciphertext for the remaining portion 86 are sent to the data buffer 22 in this order.

The encrypted data segments may be transmitted as an encrypted data stream for secure data communication, or may be stored on a data storage device to prevent, for example, sensitive or protected information from being read by an unauthorized person.

Figure 11:
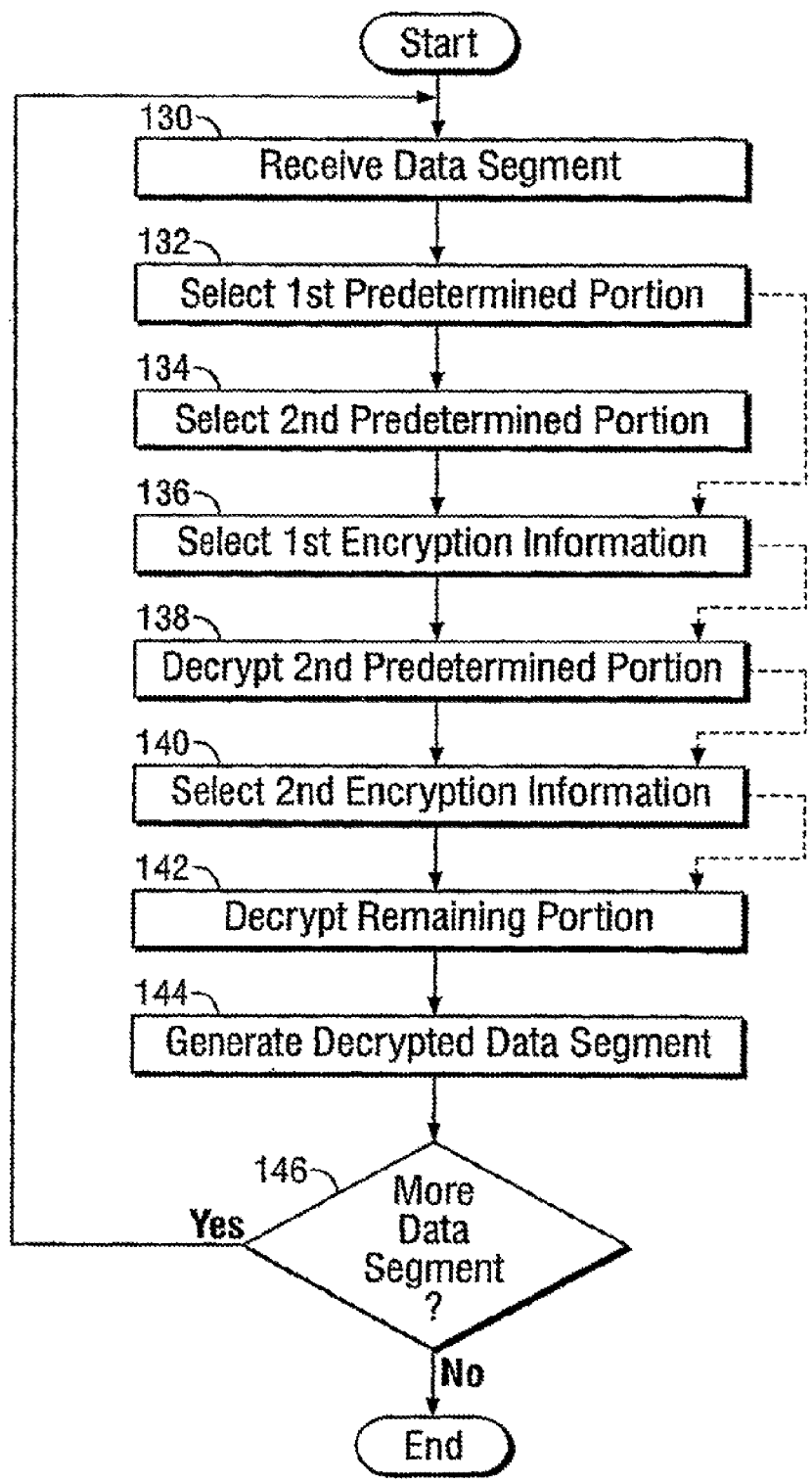
FIG. 11 is a process flow diagram schematically illustrating a method for decrypting encrypted data in accordance with one embodiment of the present invention, in which the predetermined portion includes a first predetermined portion and a second predetermined portion.
Figure 12:
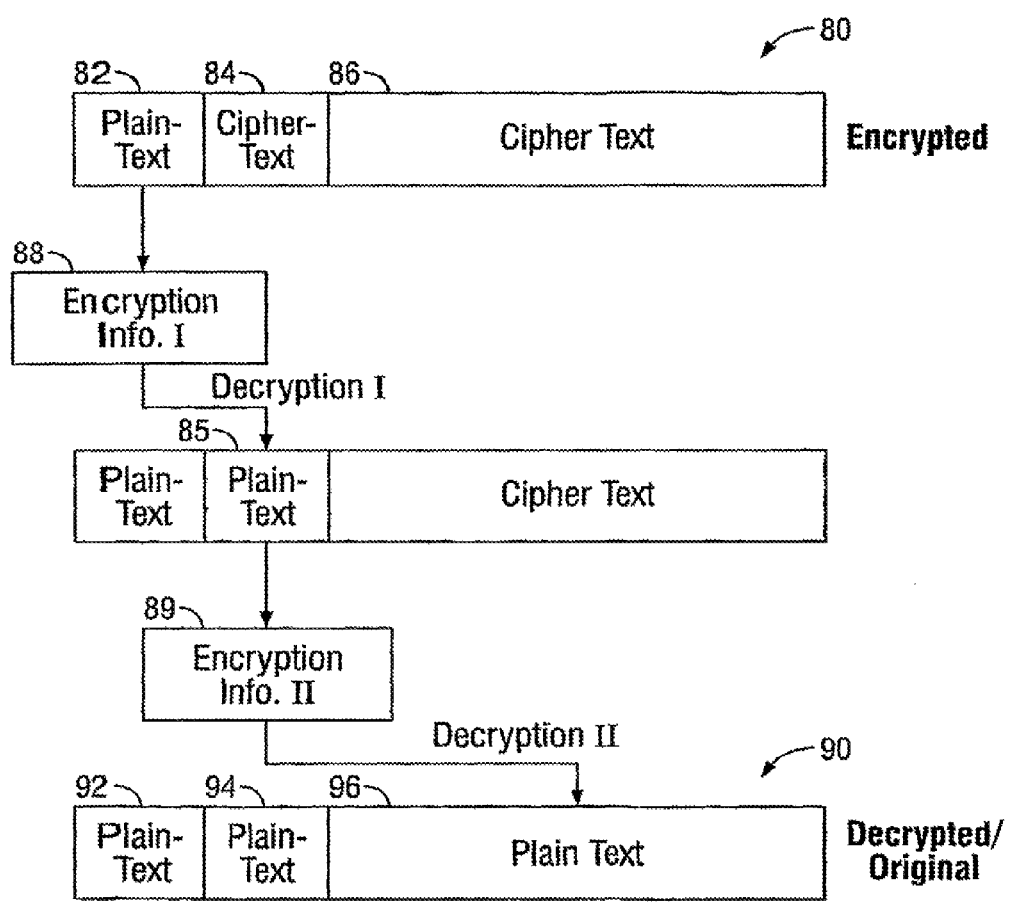
FIG. 12 is a diagram schematically illustrating an example of decrypting a data packet using the method shown in FIG. 11.

FIG. 11 schematically illustrates a method for decrypting encrypted data in accordance with one embodiment of the present invention, in which the predetermined portion includes a first predetermined portion and a second predetermined portion. FIG. 12 schematically illustrates an example of decrypting an encrypted data packet 80 using the method shown in FIG. 11, where the encrypted data packet 80 includes a first predetermined portion 82 (such as an IP header) and a second predetermined portion 84 (such as a TCP header or a selected portion of the data field). As described above, the first predetermined portion 82 contains plaintext, and the second predetermined portion and the remaining portion 86 contain ciphertext.

As shown in FIG. 11, for each encrypted data segment received (130), the first predetermined portion and the second predetermined portion are selected (132, 134). The encrypted data segments may be received as an encrypted data stream in a secure communication, or may be read from a data storage device. Also referring to FIG. 12, the first encryption information 88 is selected based on the data contained in the first predetermined portion 82 (136). Similarly to the encryption process discussed above, this selection 136 may include, for example, deriving a hash value from the first predetermined portion 82 and selecting the first encryption information using an encryption table associating the hash value with a respective set of encryption information. Since the first predetermined portion contains the plaintext, the first encryption information is the same as the original data segment.

Then, the second predetermined portion 84, which contains the ciphertext, is decrypted using the first encryption information 88 (138). The second encryption information 89 is selected based on the decrypted data 85 contained in the second predetermined portion 84 (140). This selection 138 may also include, for example, deriving a hash value from the decrypted data 85 and selecting the second encryption information 89 using an encryption table associating the hash value with a respective set of encryption information. A respective hash key and a respective encryption table may be provided for each of the selection process 136 and 138.

Then, the remaining portion 86 of the data segment is decrypted using the second encryption information 89 (142). The remaining portion 86 is all of the remaining data of the data segment other than the first and second predetermined portions. The first predetermined portion 92, the second predetermined portion 94, and the remaining portion 96 are combined to generate an decrypted data segment (packet) 90 which is the same as the original data segment (packet) 70 (144). The processes 130 through 144 are performed until all of the encrypted data segments are decrypted (146).

Figure 13:
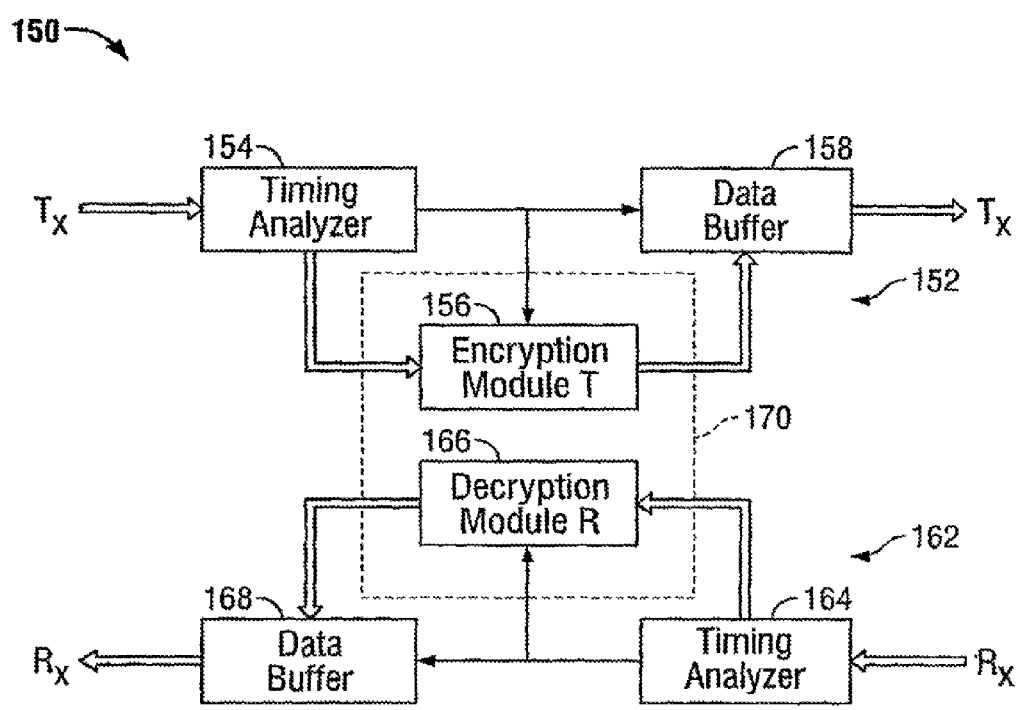
FIG. 13 is a block diagram schematically illustrating a data encryptor/decryptor in accordance with one embodiment of the present invention.

FIG. 13 schematically illustrates a data encryptor/decryptor 150 in accordance with one embodiment of the present invention. As shown in FIG. 13, the data encryptor/decryptor includes a transmitting portion 152 and a receiving portion 162. The transmitting portion 152 includes a first timing analyzer 154, an encryption module (T) 156, and a first data buffer 158. Similarly, the receiving portion 162 includes a second timing analyzer 164, a decryption module (R) 166, and a second data buffer 168. The encryption module 156 may be the encryption part of the encryption/decryption apparatus 10 (the encryption module 14 and the controller 16) described above, and the decryption module 166 may be the encryption part 10' of the encryption/decryption apparatus 10 described above. In the transmitting portion, for example, the input buffer 12 (in FIG. 1A) may be integrated within the timing analyzer 154 in accordance with a specific implementation. The output buffer 18 (in FIG. 1A) may also be integrated within the data buffer 158 in accordance with a specific implementation. The same applies to the receiving portion 154.

Since the data encryptor/decryptor 150 typically transmits and receives a data stream (Tx and Rx), the timing analyzers 154 and 164 synchronize the encryption/decryption processes for the corresponding data stream such that encrypted/decrypted data are properly combined into respective encrypted/decrypted data segments (data packets) and sent to and output from the data buffers 158 and 168, respectively.

In accordance with one embodiment of the present invention, the data encryptor/decryptor 150 (and the encryption/decryption apparatus 10) can be implemented in a form of a plug-in card for a computer. Since all of the necessary components for encryption/decryption are provided in the data encryptor/decryptor (encryption/decryption card), the user/computer does not have to install any specific software program for encryption/decryption so long as the computer can use the encryption/decryption card (i.e., port-compatible). By simply transmitting or storing data via the encryption/decryption card, the data is automatically encrypted and thus securely transmitted through a network or securely stored in a storage device. The same encryption/decryption card can be used to receive securely transmitted data or read the securely stored data.

To receive or read the encrypted data, the same encryption/decryption card or apparatus must be used to decrypt the encrypted data. The "same" means that the card or apparatus is capable of selecting the same predetermined first and second portions from the data segments and selecting/deriving the same first and second encryption information if the data contained in the predetermined portion is the same. Typically, for example, the corresponding (communicating) encryption/decryption cards have the identical hash keys and the identical encryption tables.

In accordance with one embodiment of the present invention, the encryption/decryption module part 170 (in FIG. 13) can be customized according to the user's request at the time of manufacturing or initial programming. For example, since the encryption/decryption card can be implemented in field programmable logic devices (FPLDs), such as FPGAs and CPLDs, the encryption/decryption card or apparatus can be programmed in accordance with the user's specification (e.g., the degree of security, transmission speed, required protocol or standard, specific storage medium and/or format to be used, etc.) with specific settings of the hash keys and encryption tables (encryption information).

In addition, the user and the computer do not have to know the settings, and the settings are not accessible to the user and computer, such information cannot be stolen from the user or the computer to "crack the code." Furthermore, the encryption algorithm, the encryption key, and optionally the encryption parameter are practically changed for every data segment, and which algorithm, key, and parameter to be used are only "known" to the data segment itself to be encrypted. Since the encryption algorithm, key, and/or parameter are automatically changed based on certain data contained in the data segment itself, synchronization between the transmitting side and the receiving side is unnecessary.

Figure 14:
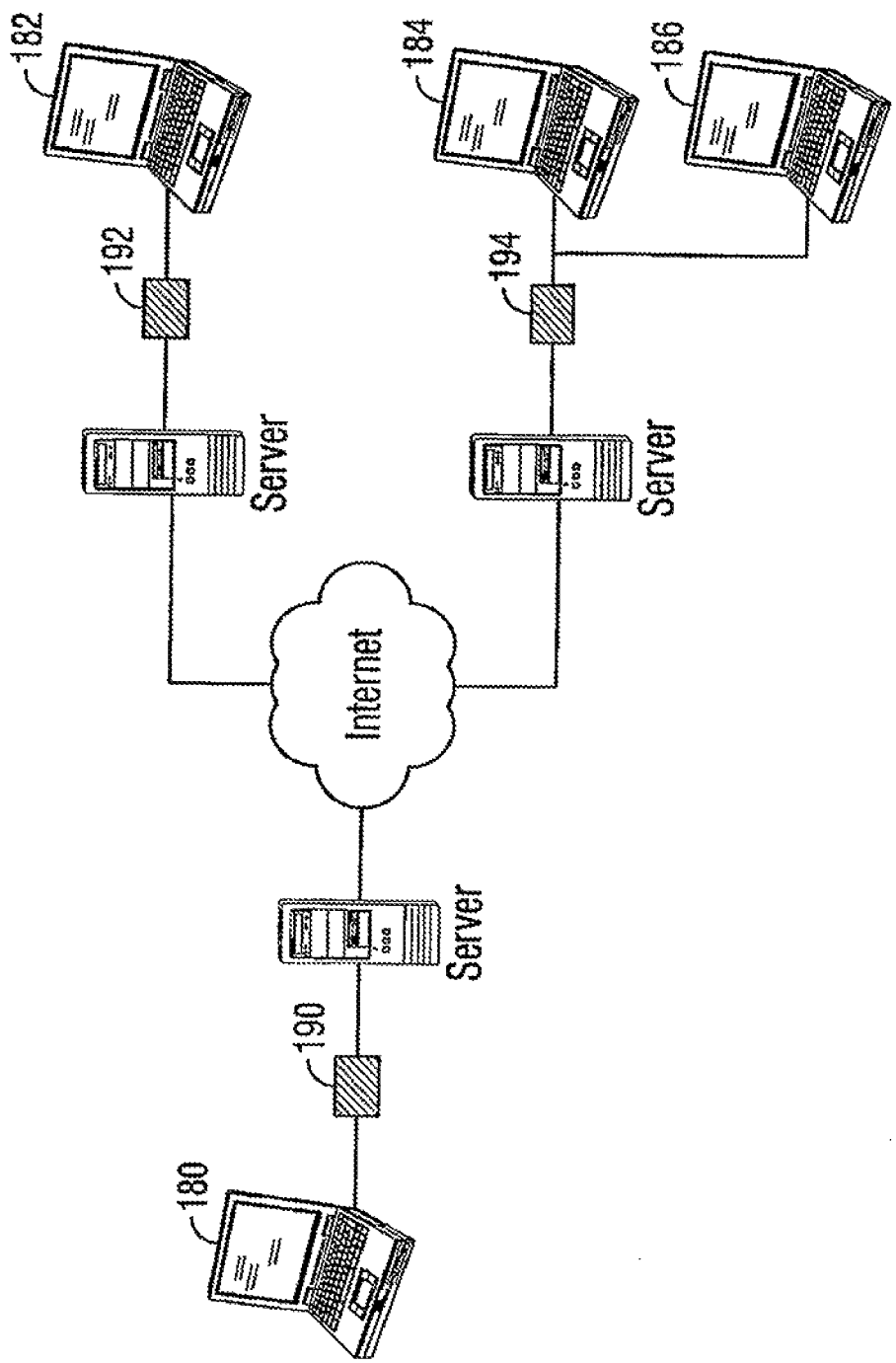
FIG. 14 is a diagram schematically illustrating an example of application of the encryption/decryption apparatus to secure communications via the Internet in accordance with one embodiment of the present invention.

FIG. 14 schematically illustrates an example of application of the present invention to secure communications via the Internet. As shown in FIG. 14, users 180. 182, 184 can use respective encryption/decryption apparatuses 190, 192, and 194 in accordance with one embodiment of the present invention. The encryption/decryption apparatuses 190, 192, and 194 may be the encryption/decryption apparatus 10 or encryptor/decryptor 150 as described above. All of the encryption/decryption apparatuses 190, 192, and 194 are programmed identically and provided with the same settings, for example, the same hash keys and encryption tables. As shown in FIG. 14, the encryption/decryption apparatus may be used by more than one computers 184 and 186. For example, the encryption/decryption apparatus 194 may be used with a hub within a LAN such that all data transmissions from the computers or host connected to the hub are encrypted.

In accordance with one embodiment of the present invention, since the IP header of each data packet is not encrypted, the encryption/decryption scheme of one embodiment of the present invention does not affect routing or switching of the data packets via the Internet or other networks (i.e., operations in the network protocol layer). In addition, in the case where some routers may possibly look into a packet field other than IP header in their routing operation, the first predetermined portion can be selected such that it includes the IP header and such portion of the data field to be used by the routers.

In accordance with one embodiment of the present invention, as described above, each data segment is encrypted using the two-level encryption. That is, the data segment other than the first and second predetermined portions is encrypted using the information contained in the second predetermined portion. Then, the second predetermined portion is encrypted using the information contained in the first predetermined portion. Thus, although the first predetermined portion contains plaintext, the second predetermined portion containing encrypted data (ciphertext) provides additional level of security, since the second predetermined portion and the remaining portion are typically encrypted by a different encryption algorithm, a different encryption key, and/or a different encryption parameter. In addition, since the encryption algorithm, the encryption key, and/or the encryption parameter are changed for every data segment, it is practically impossible to clack the code by a hacker.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for cryptographically processing data, said method comprising:
   receiving a first data segment;
   identifying at least two portions of the first data segment, including a first portion and a second portion;
   generating a first hash value from the first portion of the first data segment;
   identifying a first encryption scheme from among a plurality of encryption schemes, the first encryption scheme being identified by the first hash value corresponding to the first portion of the first data segment; and
   encrypting, with a computer processor, at least a part of the first data segment using the set the first encryption segment.

2. The method of claim 1, further comprising:
   providing an encryption table for selecting an encryption scheme from a hash value, the encryption table comprising:
   an encryption type identifier;
   an encryption key for the encryption type; and
   an encryption parameter, for each entry associated with a potential hash value corresponding to the first portion of the first data segment.

3. The method of claim 1, further comprising:
   receiving a data stream comprising the first data segment and a plurality of additional data segments, each of the first data segment and the plurality additional data segments corresponding to a data packet of the data stream.

4. The method of claim 3, further comprising:
   encrypting the plurality of additional data segments; and
   transmitting plurality of encrypted data segments as a stream of encrypted data.

5. The method of claim 1, wherein the first portion contains data for a first protocol layer, and the second portion contains data for a second protocol layer.

6. The method of claim 1, wherein the first portion is an Internet Protocol (IP) header of the first data segment.

7. The method of claim 6, wherein the second portion is one of:
   a selected portion of a data field of the data packet;
   a Transmission Control Protocol (TCP) header of the data packet; and
   a User Datagram Protocol (UDP) header of the data packet.

8. The method of claim 1, further comprising:
   reading a plurality of data segments, including the first data segment, from corresponding sectors in a data storage device.

9. The method of claim 8, further comprising:
   encrypting the plurality of data segments; and
   storing the resulting plurality of encrypted data segments on a data storage device,
   each encrypted data segment corresponding to a respective data sector of the data storage device.

10. The method of claim 1, further comprising:
    generating a second hash value from the second portion of the first data segment;
    identifying a second encryption scheme from among the plurality of encryption schemes, the second encryption scheme being identified by the second hash value corresponding to the second portion of the first data segment; and
    encrypting a third portion of the first data segment using the second encryption scheme;
    wherein the second portion of the first data segment is encrypted with the first encryption scheme identified by the first hash value corresponding to the first portion of the first data segment.

11. The method of claim 10, the third portion being the remaining portion of the current data segment excluding the first portion and the second portion.

12. The method of claim 10, further comprising:
    outputting an encrypted current data segment comprising the first portion remaining unencrypted, the second portion encrypted according to the first encryption scheme, and the third portion encrypted according to the second encryption scheme.

13. The method of claim 12, further comprising:
    receiving the encrypted current data segment corresponding to the current data segment;
    selecting a first decryption scheme and a second decryption scheme;
    decrypting the encrypted current data segment to recover the current data segment by applying a first decryption scheme to the encrypted second predetermined portion and applying a second decryption scheme to the encrypted third predetermined portion.

14. The method of claim 1, wherein identifying a first encryption scheme from among the plurality of encryption schemes comprises:
    locating the first hash value in an encryption table configured to map a plurality of values to a plurality of encryption schemes; and
    identifying the first encryption scheme as corresponding to the first hash value in the encryption table.

15. The method of claim 1, further comprising:
    receiving a plurality of additional data segments; and
    encrypting the plurality of additional data segments using a plurality of encryption schemes identified by hash values corresponding to portions of the plurality of additional data segments.

16. An apparatus for cryptographically processing data, comprising:
    an input buffer that receives a data segment;
    a hardware controller that is coupled to the input buffer, generates a first hash value from a first portion of the data segment, and dynamically selects a first encryption scheme from a plurality of encryption schemes, each encryption scheme comprising an encryption algorithm and an encryption key, and the first encryption scheme corresponding to the first hash value;

an encryption module that is coupled to the hardware controller and utilizes a computer processor to encrypt a second portion of the data segment using the first encryption scheme; and an output buffer that is coupled to the encryption module and outputs encrypted data corresponding to the data segment.

17. The apparatus of claim 16, wherein the input buffer further receives a plurality of additional data segments, and the encryption module further encrypts the plurality of additional data segments, wherein said controller changes at least one of an encryption algorithm, an encryption key, and an encryption parameter for each of the plurality of additional data segment.

18. The apparatus of claim 16, wherein said encryption module comprises:

a plurality of encryption engines, each encryption engine corresponding to a distinct encryption algorithm.

19. The apparatus of claim 18, wherein said encryption module further comprises:

a data buffer coupled to each of the plurality of encryption engines.

20. The apparatus of claim 18, wherein said controller comprises:

an encryption controller that selects and activate an encryption engine for encrypting the second portion of the data segment based on the first encryption scheme corresponding to the first hash value.

21. The apparatus of claim 16, the controller comprising an encryption table for selecting an encryption scheme from a hash value, the encryption table comprising:

an encryption type identifier;
an encryption key for the encryption type; and
an encryption parameter,
for each entry associated with a potential hash value corresponding to the first portion of the data segment.

22. The apparatus of claim 16, the input buffer further receiving a data stream comprising a plurality of data packets, the data segment being at least one of the data packets.

23. The apparatus of claim 22, the first portion of the data segment comprising data for a first protocol layer, and the second portion comprising data for a second protocol layer, wherein the first protocol layer is lower than the second protocol layer.

24. The apparatus of claim 23, the first portion of the data segment being an Internet Protocol (IP) header.

25. The apparatus of claim 24, the second portion is of the data segment being one of:

a selected portion of a data field of the data packet;
a Transmission Control Protocol (TCP) header of the data packet; and
a User Datagram Protocol (UDP) header of the data packet.

26. The method of claim 16, the input buffer further reading the data segment from a sector of a data storage device.

27. The apparatus of claim 26, the first portion of the data segment being a first selected portion in the sector of the data storage device, and the second portion is being a second selected portion of the sector.

28. The apparatus of claim 16, wherein the controller further:

generates a second hash value from the second portion of the data segment; and
dynamically selects a second encryption scheme from the plurality of encryption schemes, the second encryption scheme corresponding to the second hash value; and
the encryption module further:

encrypts a third portion of the data segment using the second encryption scheme.

29. The apparatus of claim 28, the controller further comprising:

a first encryption table for mapping a plurality of potential hash values to the plurality of encryption schemes, wherein the controller identifies the first encryption scheme as corresponding to the first hash value in the first encryption table; and
a second encryption table for mapping a plurality of potential hash values to the plurality of encryption schemes, wherein the controller identifies the second encryption scheme as corresponding to the second hash value in the second encryption table.

30. The apparatus of claim 16, wherein the controller selects the first encryption scheme from the plurality of encryption schemes by:

locating the first hash value in an encryption table configured to map a plurality of values to a plurality of encryption schemes; and
identifying the first encryption scheme as corresponding to the first hash value in the encryption table.

31. The apparatus of claim 16, wherein the input buffer further receives a plurality of additional data segments, and the encryption module further encrypts the plurality of additional data segments using a plurality of encryption schemes identified by hash values corresponding to portions of the plurality of additional data segments.

32. An apparatus for cryptographically processing data, comprising:

an input buffer that receives a data segment;
a hardware controller coupled to said input buffer, wherein said controller generates a first hash value from a first portion of the data segment and dynamically selects a first encryption scheme from a plurality of encryption schemes, each encryption scheme comprising an encryption algorithm and an encryption key, and the first encryption scheme corresponding to the first hash value;
a decryption module that is coupled to the hardware controller and utilizes a computer processor to decrypt a second portion of the encrypted data segment using the first encryption scheme; and
an output buffer coupled to said decryption module, wherein said output buffer outputs decrypted data corresponding to the encrypted data segment.

33. The apparatus of claim 32, wherein said decryption module comprises:

a plurality of decryption engines, each decryption engine corresponding to a distinct encryption algorithm.

34. The apparatus of claim 33, wherein said decryption module further comprises:

a data buffer coupled to each of the plurality of decryption engines.

35. The apparatus of claim 33, wherein said controller comprises:

a decryption controller that selects and activates a decryption engine for encrypting the second portion of the data segment based on the first encryption scheme corresponding to the first hash value.

36. The apparatus of claim 32, the controller comprising an encryption table for selecting an encryption scheme from a hash value, the encryption table comprising:

an encryption type identifier;
an encryption key for the encryption type; and
an encryption parameter, for each entry associated with a potential hash value corresponding to the first portion of the data encrypted segment.

37. The apparatus of claim 32, wherein the input buffer further receives a data stream comprising a plurality of data packets, the encrypted data segment being at least one of the data packets.

38. The apparatus of claim 37, the first portion of the encrypted data segment comprising data for a first protocol layer, and the second portion comprising data for a second protocol layer, wherein the first protocol layer is lower than the second protocol layer.

39. The apparatus of claim 38, the first portion is of the encrypted data segment being an Internet Protocol (IP) header.

40. The apparatus of claim 39, the second portion is of the encrypted data segment being one of:
   a selected portion of a data field of the data packet;
   a Transmission Control Protocol (TCP) header of the data packet; and
   a User Datagram Protocol (UDP) header of the data packet.

41. The method of claim 32, wherein the input buffer further reads the encrypted data segment from a sector of a data storage device.

42. The apparatus of claim 41, the first portion of the encrypted data segment being a first selected portion in the sector of the data storage device, and the second portion is being a second selected of the sector.

43. The apparatus of claim 32, wherein:
   the controller further:
      generates a second hash value from the second portion of the data segment; and
      dynamically selects a second encryption scheme from the plurality of encryption schemes, the second encryption scheme corresponding to the second hash value; and
   the decryption module further:
      decrypts a third portion of the data segment using the second encryption scheme.

44. The apparatus of claim 43, the controller further comprising:
   a first encryption table for mapping a plurality of potential hash values to the plurality of encryption schemes, wherein the controller identifies the first encryption scheme as corresponding to the first hash value in the first encryption table; and
   a second encryption table for mapping a plurality of potential hash values to the plurality of encryption schemes, wherein the controller identifies the second encryption scheme as corresponding to the second hash value in the second encryption table.

45. The apparatus of claim 32, wherein the controller selects the first encryption scheme from the plurality of encryption schemes by:
   locating the first hash value in an encryption table configured to map a plurality of values to a plurality of encryption schemes; and
   identifying the first encryption scheme as corresponding to the first hash value in the encryption table.

46. The apparatus of claim 32, wherein the input buffer further receives a plurality of additional data segments, and the decryption module further decrypts the plurality of additional data segments using a plurality of encryption schemes identified by hash values corresponding to portions of the plurality of additional data segments.

47. A computer-implemented method for cryptographically processing data, the method comprising:
   receiving a data segment;
   selecting an unencrypted first portion, an unencrypted second portion, and an unencrypted third portion of the data segment;
   generating a first hash value from the unencrypted first portion of the data segment;
   associating each of a plurality of potential hash values with a corresponding encryption scheme belonging to a plurality of encryption schemes;
   identifying a first encryption scheme of the plurality of encryption schemes, the first encryption scheme corresponding to a potential hash value that matches the first hash value;
   encrypting, with a computer processor, the unencrypted second portion of the data segment to provide an encrypted second portion by applying the first encryption scheme;
   generating a second hash value from the unencrypted second portion of the data segment;
   identifying a second encryption scheme of the plurality of encryption schemes, the second encryption scheme corresponding to a potential hash value that matches the second has value;
   encrypting the unencrypted third portion of the data segment to provide an encrypted third portion by applying the second encryption scheme; and
   outputting an encrypted data segment corresponding to the data segment, the encrypted data segment comprising the unencrypted first portion, the encrypted second portion, and the encrypted third portion of the data segment.

48. The method of claim 47, the unencrypted first portion of the data segment being data corresponding to an internet protocol header of the data segment.

49. The method of claim 47, further comprising:
   identifying the first encryption scheme from the first unencrypted portion of the encrypted data segment;
   recovering the unencrypted second portion by decrypting the encrypted second portion according to the first encryption scheme;
   identifying the second encryption scheme from the unencrypted second portion of the encrypted data segment; and
   recovering the unencrypted second portion by decrypting the encrypted second portion according to the second encryption scheme.

50. A computer-implemented method for cryptographically processing data, the method comprising:
   receiving an encrypted data segment comprising an unencrypted first portion, an encrypted second portion, and an encrypted third portion;
   generating a first hash value from the unencrypted first portion of the encrypted data segment;
   associating each of a plurality of potential hash values with a corresponding encryption scheme belonging to a plurality of encryption schemes;
   identifying a first encryption scheme of the plurality of encryption schemes, the first encryption scheme corresponding to a potential hash value that matches the first hash value;
   decrypting, with a computer processor, the encrypted second portion of the encrypted data segment to provide an unencrypted second portion by applying the first encryption scheme;
   generating a second hash value from the unencrypted second portion of the data segment;

identifying a second encryption scheme of the plurality of encryption schemes, the second encryption scheme corresponding to a potential hash value that matches the second hash value;

decrypting the encrypted third portion of the data segment to provide an unencrypted third portion by applying the second encryption scheme; and outputting an decrypted data segment corresponding to the encrypted data segment, the decrypted data segment comprising the unencrypted first portion, the unencrypted second portion, and the unencrypted third portion.

51. The method of claim 50, the unencrypted first portion of the data segment being data corresponding to an internet protocol header of the encrypted data segment.

* * * * *